United States Patent [19]

Hewette et al.

[11] Patent Number: 4,782,811

[45] Date of Patent: Nov. 8, 1988

[54] EXHAUST GAS RECIRCULATION VALVE CONSTRUCTION AND METHOD OF MAKING THE SAME

[75] Inventors: Chip Hewette, Knoxville; Jay L. Lewis, Knox County, both of Tenn.

[73] Assignee: Robertshaw Controls Company, Richmond, Va.

[21] Appl. No.: 32,509

[22] Filed: Mar. 30, 1987

[51] Int. Cl.[4] ...................... F02M 25/06; F16K 31/04

[52] U.S. Cl. ................................ 123/571; 251/129.11

[58] Field of Search .................. 123/571; 251/129.11, 251/129.15

[56] References Cited

U.S. PATENT DOCUMENTS

| | | | |
|---|---|---|---|
| 4,064,851 | 12/1977 | Wessel | 123/571 |
| 4,173,205 | 11/1979 | Toelle | 123/571 |
| 4,203,573 | 5/1980 | Boss | 251/129.11 |
| 4,412,517 | 11/1983 | Kobashi et al. | 123/339 |
| 4,473,056 | 9/1984 | Ishida et al. | 123/571 |
| 4,499,920 | 2/1985 | Steffan et al. | 137/624.15 |
| 4,561,408 | 12/1985 | Jenkins | 123/571 |
| 4,595,081 | 6/1986 | Parsons | 251/129.11 |
| 4,673,160 | 6/1987 | Tolley | 251/129.11 |
| 4,674,464 | 6/1987 | Akagi | 123/571 |

FOREIGN PATENT DOCUMENTS 2406176 8/1974 Fed. Rep. of Germany ........................ 251/129.11

*Primary Examiner*—Willis R. Wolfe

*Attorney, Agent, or Firm*—Candor, Candor & Tassone

[57] ABSTRACT

An exhaust gas recirculation valve construction and method of making the same are provided, the valve construction comprising a housing provided with an inlet and an outlet separated by a valve seat, an axially movable valve member carried by the housing for opening and closing the valve seat, an electrically operated stepper motor carried by the housing and being operatively interconnected to the valve member for axially positioning the valve member relative to the valve seat, the motor having a rotatable rotor threadedly interconnected to the valve member to cause axial movement of the valve member upon rotatable movement of the rotor, the valve member and the valve seat being arranged so as to be reverse acting, and a spring being operatively interconnected to the valve member to always move the valve member from an open position thereof to its closed position with the valve seat upon loss of electrical current to the motor.

14 Claims, 5 Drawing Sheets

EXHAUST GAS RECIRCULATION VALVE CONSTRUCTION AND METHOD OF MAKING THE SAME

BACKGROUND OF THE INVENTION

1. Field of the Invention

This invention relates to a new exhaust gas recirculation valve construction and method of making the same as well as to a new vehicle exhaust gas recirculation system and method of making the same.

2. Prior Art Statement

It is known to provide an exhaust gas recirculation valve construction comprising a housing means provided with an inlet and an outlet separated by a valve seat, a movable valve member carried by the housing means for opening and closing the valve seat, and an electrically operated stepper motor means carried by the housing means and being operatively interconnected to the valve member for positioning the valve member relative to the valve seat. For example, see the U.S. Pat. No. 4,473,056, to Ishida et al; the U.S. Pat. No. 4,064,851 Wessel, and the U.S. Pat. No. 4,173,205 to Toelle.

Also see the U.S. Pat. No. 4,412,517 to Kobashi et al, and the U.S. Pat. No. 4,499,920 to Steffan et al, for other arrangements wherein a stepper motor is utilized to position a valve member relative to a valve seat.

SUMMARY OF THE INVENTION

One feature of this invention is to provide a new exhaust gas recirculation valve construction wherein the means for positioning the valve member relative to the valve seat can comprise an electrically operated stepper motor and the valve member will be moved to its closed position upon the loss of electrical current to the stepper motor.

In particular, it was found according to the teachings of this invention that the valve member and the valve seat of the exhaust gas recirculation valve construction can be arranged so that the valve member and valve seat are reverse acting and that a spring can be operatively interconnected to the valve member to tend to move the valve member to its closed position with the valve seat upon the loss of electrical current to the motor.

For example, one embodiment of this invention provides an exhaust gas recirculation valve construction comprising a housing means provided with an inlet and an outlet separated by a valve seat, a movable valve member carried by the housing means for opening and closing the valve seat, and an electrically operated stepper motor means carried by the housing means and being operatively interconnected to the valve member for positioning the valve member relative to the valve seat, the valve member and the valve seat being arranged so as to be reverse acting and a spring means being operatively interconnected to the valve member to tend to move the valve member to its closed position with the valve seat upon the loss of electrical current to the motor means.

Accordingly, it is an object of this invention to provide a new exhaust gas recirculation valve construction having one or more of the novel features of this invention as set forth above or hereinafter shown or described.

Another object of this invention is to provide a new method of making an exhaust gas recirculation valve construction, the method of this invention having one or more of the novel features of this invention as set forth above or hereinafter shown or described.

Another object of this invention is to provide a new vehicle exhaust gas recirculation system having one or more of the novel features of this invention as set forth above or hereinafter shown or described.

Another object of this invention is to provide a new method of making a vehicle exhaust gas recirculation system, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
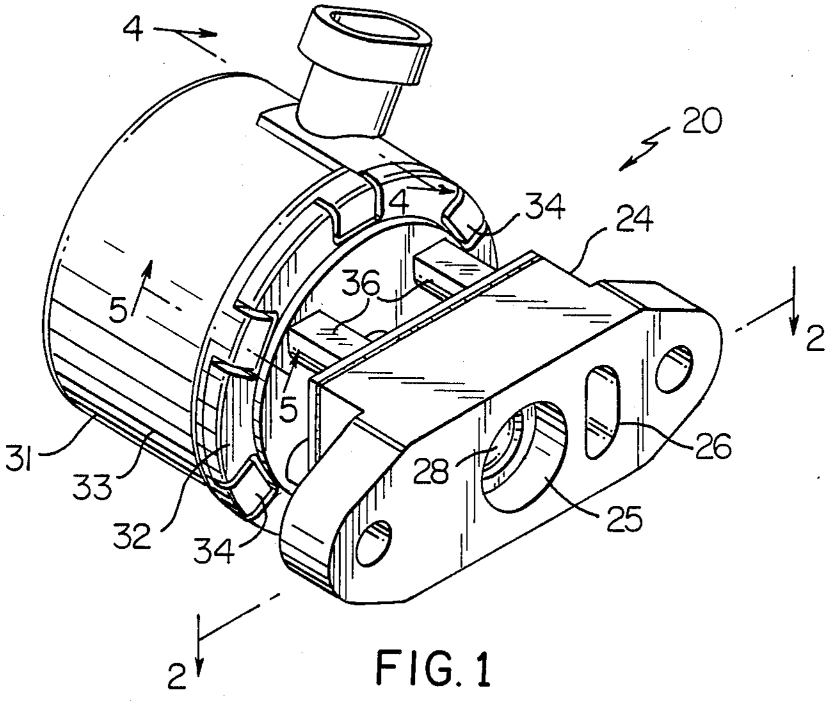
FIG. 1 is a perspective view of the new exhaust gas recirculation valve construction of this invention.

While the various features of this invention are hereinafter described and illustrated as being particularly adapted to provide an exhaust gas recirculation valve construction for an automobile, it is to be understood that the various features of this invention can be utilized singly or in any combination thereof to provide an exhaust gas recirculation valve construction for other vehicles as desired.

Therefore, this invention is not to be limited to only the embodiment illustrated in the drawings, because the drawings are merely utilized to illustrate one of the wide variety of uses of this invention.

Figure 2:
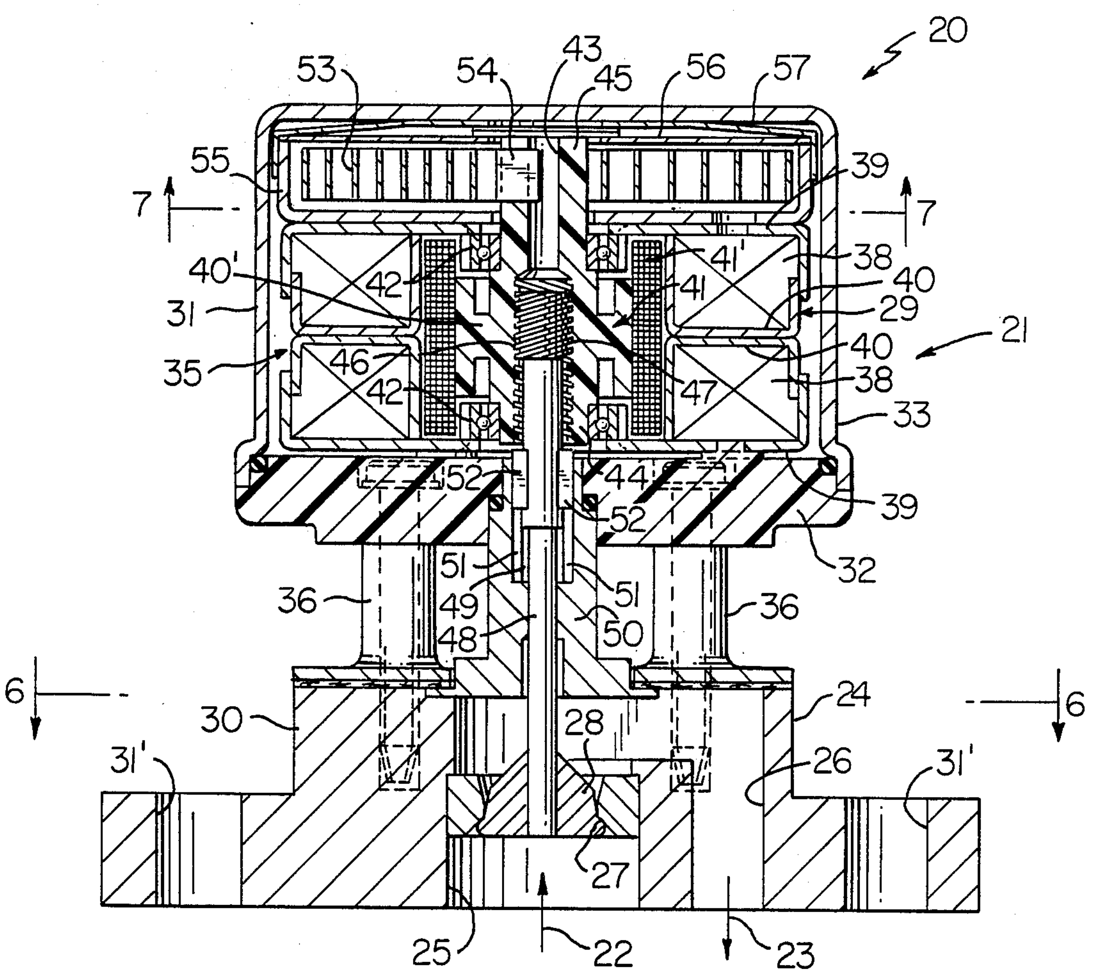
FIG. 2 is an enlarged cross-sectional view taken on line 2—2 of FIG. 1 and illustrating the valve member thereof in its closed position.

Referring now to FIGS. 1 and 2, the new exhaust gas recirculation valve construction of this invention is generally indicated by the reference numeral 20 and is adapted to be utilized in a vehicle exhaust gas recirculation system that is generally indicated by the reference numeral 21 in FIG. 2 and comprising an exhaust gas source 22 of a vehicle internal combustion engine (not shown) and an intake manifold means 23 of such engine, such vehicle exhaust gas recirculation system being conventional in the art as fully set forth in the aforementioned three U.S. Patents, namely, Ishida, U.S. Pat. No.

4,473,056, Wessel, U.S. Pat. No. 4,064,851 and Toelle, U.S. Pat. No. 4,173,205, whereby these three patents are being incorporated into this disclosure by this reference thereto.

Thus, since the reasons for and the operation of an exhaust gas recirculation valve construction are well known in the art, only the structural details of the valve construction 20 of this invention necessary for understanding the features of this invention will now be described.

As illustrated in FIGS. 1 and 2, the exhaust gas recirculation valve construction 20 of this invention comprises a housing means 24 that is provided with an inlet 25 and outlet 26 separated by a valve seat 27, a movable valve member 28 carried by the housing means 24 for opening and closing the valve seat 27, and a positioning means that is generally indicated by the reference numeral 29 and is carried by the housing means 24 for positioning the valve member 28 relative to the valve seat 27, the positioning means 29 of this invention comprising an electrically operated stepper motor as will be apparent hereinafter.

The housing means 24 of the valve construction 20 of this invention has a first section 30 (formed of any suitable material) containing the inlet 25, outlet 26 and valve seat 27 and having suitable openings 31' for mounting the valve construction 20 to any suitable structure. The housing means 24 also includes another section 31 that comprises a plate means 32 and a cup-shaped casing 33 secured to the plate means 32 by turned over tangs 34 so as to define a chamber 35 therein in which the stepper motor 29 is mounted in a manner hereinafter set forth.

The housing section 31 is secured in spaced relation to the housing section 30 by suitable spacers or posts 36 through which suitable threaded fastening members 37 are utilized as indicated.

Figure 3:
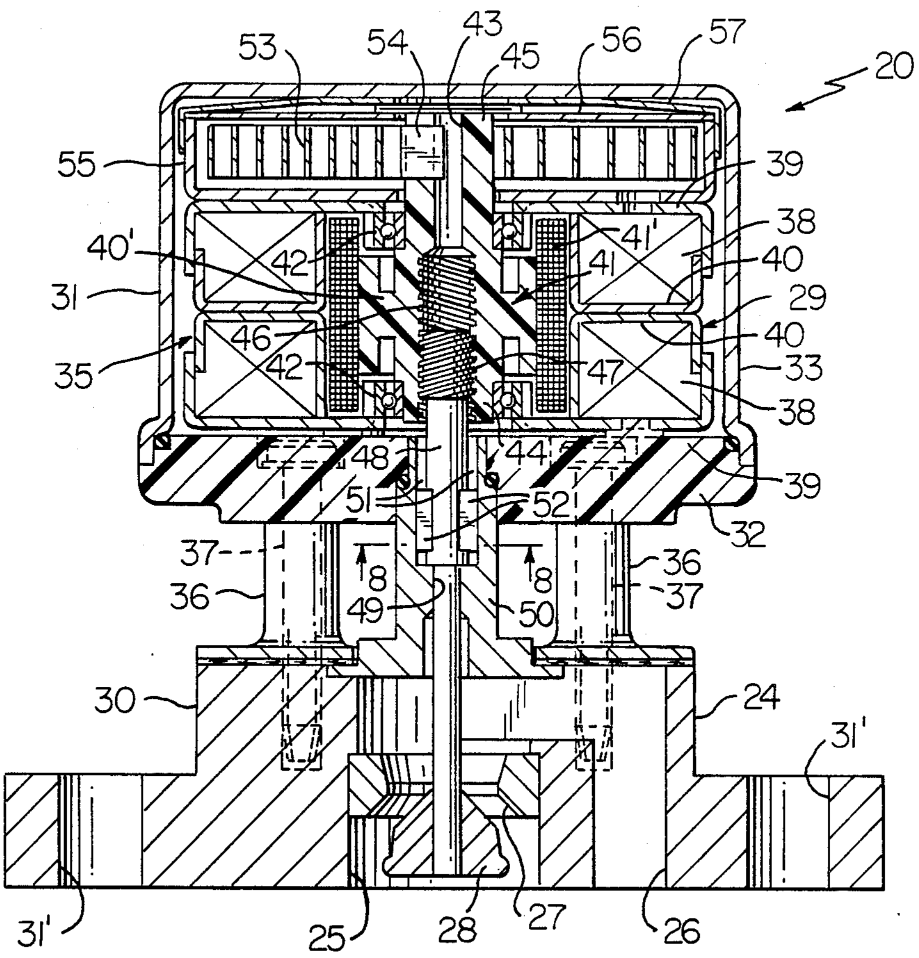
FIG. 3 is a view similar to FIG. 2 and illustrates the valve member in its open position.

The valve seat 27 and valve member 28 are so constructed and arranged that the same provide a reverse acting arrangement, i.e., the valve member 28 when moving away from the valve seat 27 to open the same moves into the inlet 25 in the manner illustrated in FIG. 3. In this manner, since the intake manifold 23 is interconnected to the outlet 26, the vacuum of the intake manifold 23 creates a pressure differential across the valve member 28 that tends to move the valve member 28 in a direction to close the valve member 28 against the valve seat 27 for a purpose hereinafter set forth.

Thus, the inlet 25 of the valve construction 20 is adapted to be disposed in fluid communication with the exhaust gas supply 22 as is conventional in the art.

The stepper motor means 29 comprises coil means 38 carried by cooperating cup-shaped outer casing members 39 and two cup-shaped inner casing members 40, and a central rotor 41 that is rotatably mounted to the outer casing members 39 by bearing means 42. The rotor 41 comprises a hollow cylindrical magnet 41' carried by a hub 40'.

Figure 4:
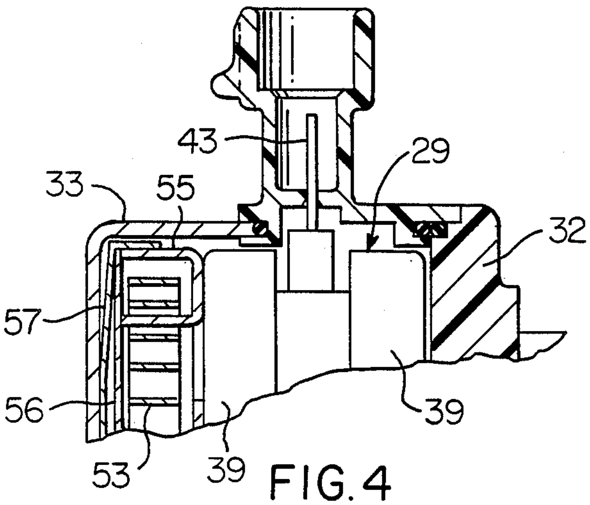
FIG. 4 is a fragmentary cross-sectional view taken on line 4—4 of FIG. 1.
Figure 5:
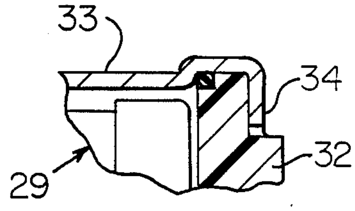
FIG. 5 is a fragmentary cross-sectional view taken on line 5—5 of FIG. 1.
Figure 6:
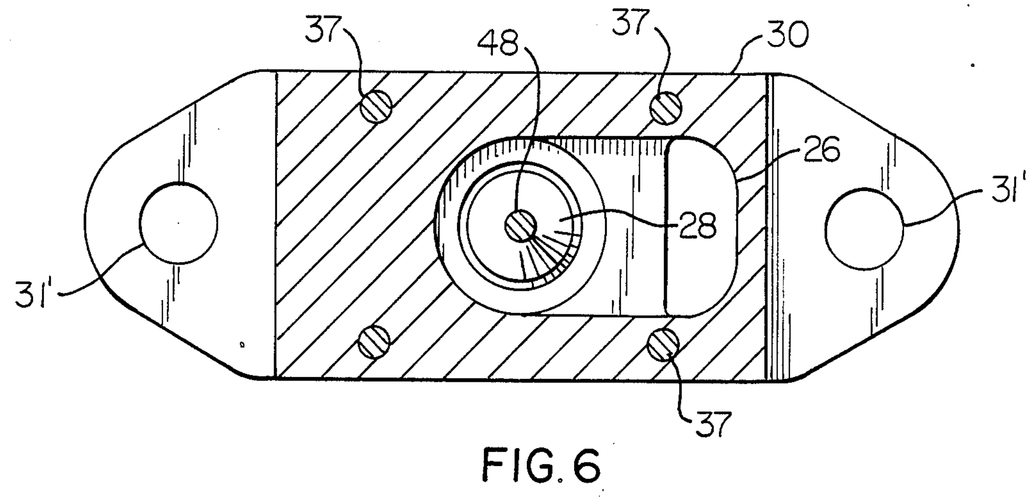
FIG. 6 is a cross-sectional view taken on line 6—6 of FIG. 2.
Figure 7:
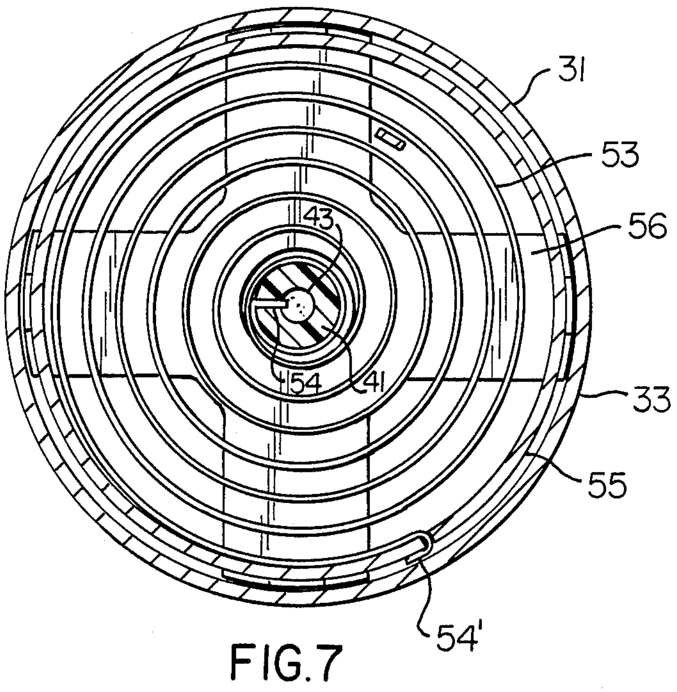
FIG. 7 is a cross-sectional view taken on line 7—7 of FIG. 2.
Figure 10:
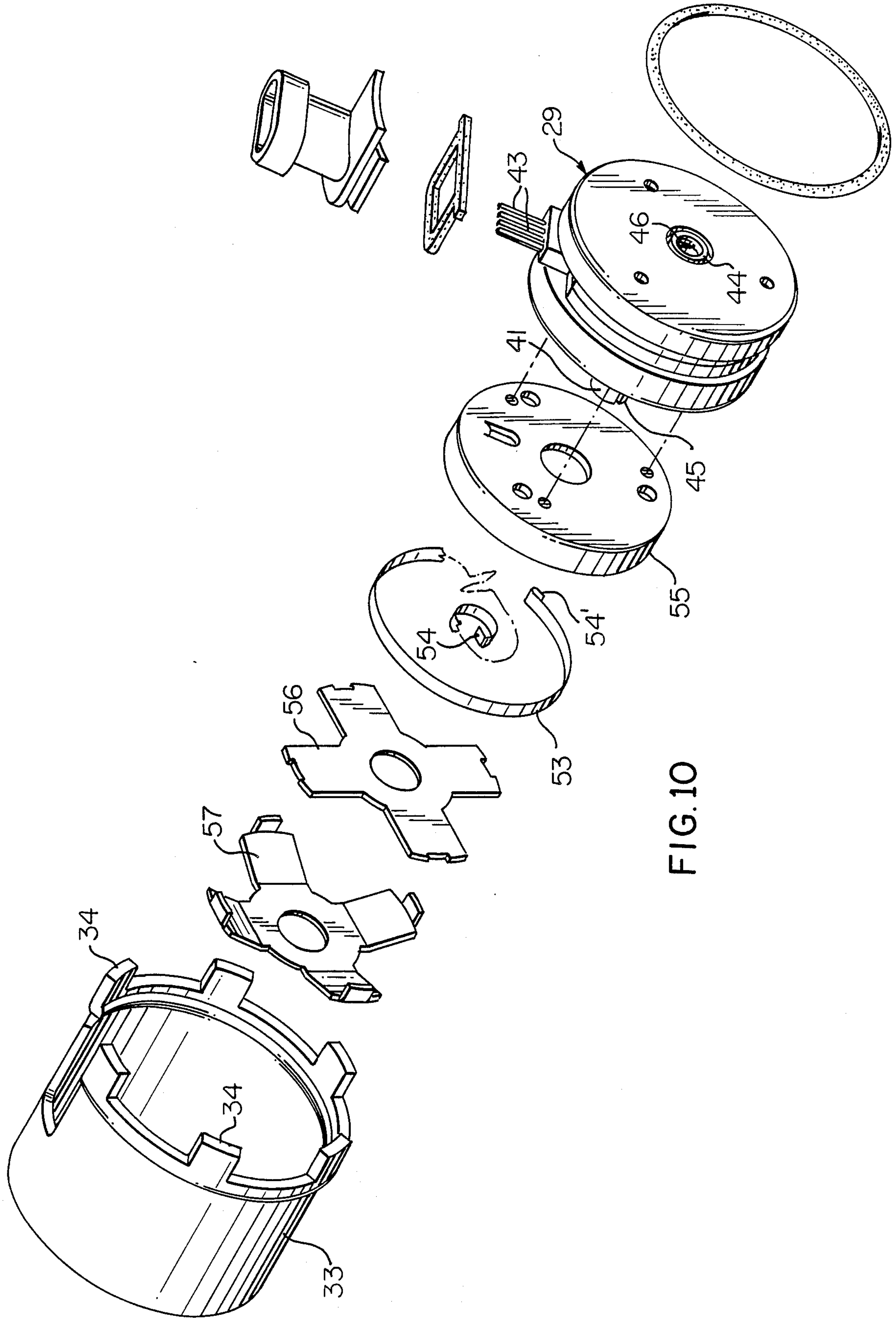
FIG. 10 is an exploded perspective view of the remaining parts of the exhaust gas recirculation valve construction of this invention.

As is well known in the art, when electrical current is directed to the coil means 38 in a certain manner, such as through suitable electrical connections to the contact pins 43, FIGS. 4 and 10, the rotor 41 is rotated incrementally in a certain direction for sequential current reversals to the coil means 38. The rotor 41 remains stationary for a given electrical condition until the current to the coil means 38 is reversed in the proper fashion. Because such operation of a stepper motor is well known in the art as set forth in the aforementioned U.S. patents, a further description of the details and operation thereof is deemed unnecessary.

Figure 8:
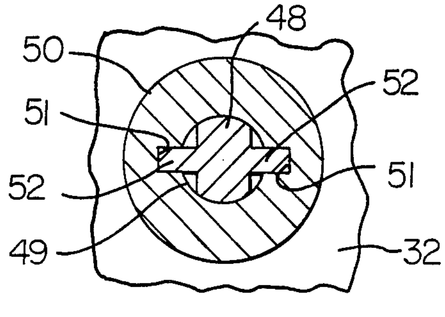
FIG. 8 is an enlarged fragmentary cross-sectional view taken on line 8—8 of FIG. 3.
Figure 9:
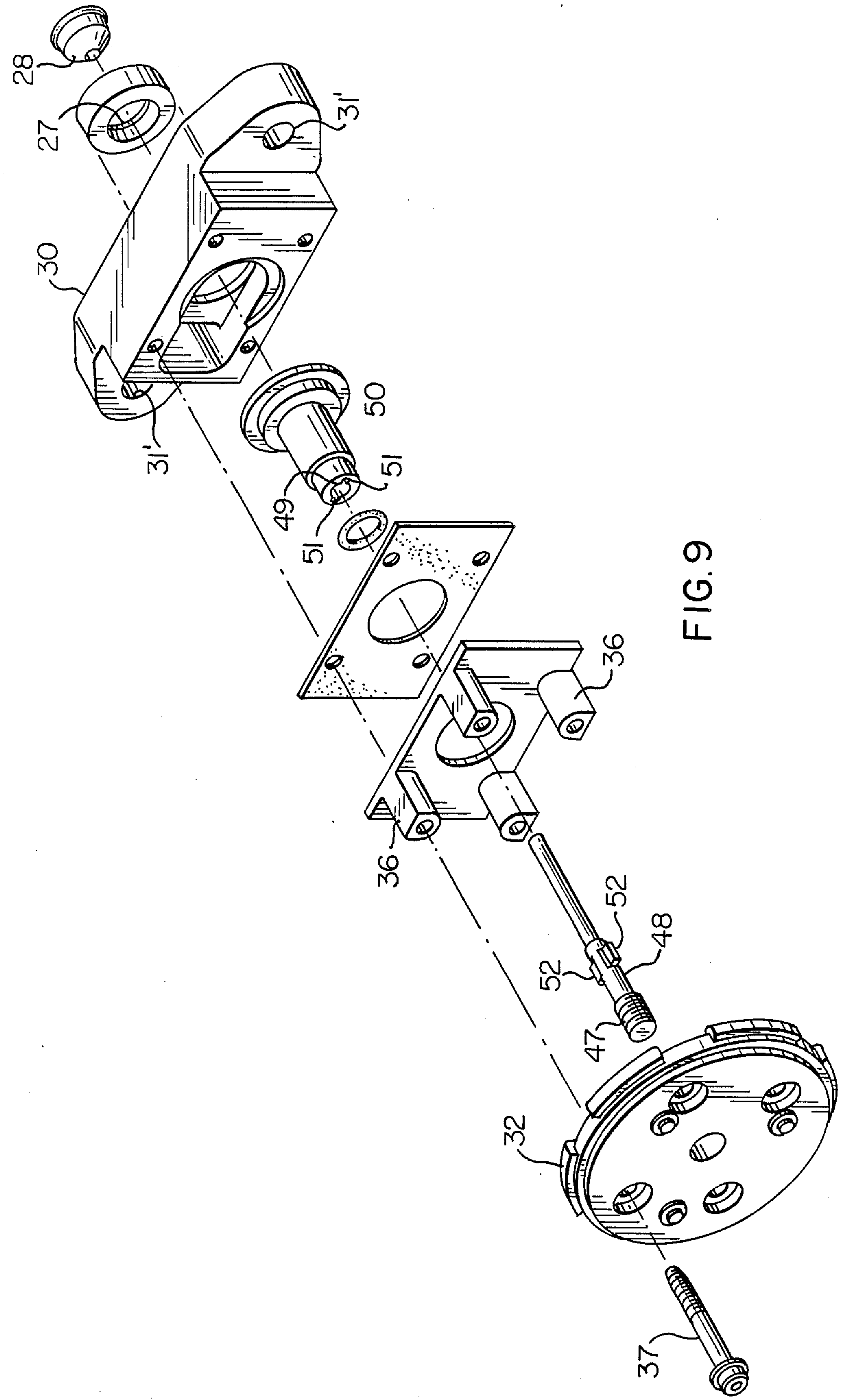
FIG. 9 is an exploded perspective view of certain parts of the exhaust gas recirculation valve construction of this invention.

The rotor 41 of the stepper motor 29 has a central opening 43 passing therethrough and interrupting the opposed sides 44 and 45 thereof, the opening 43 being internally threaded in the lower section 46 thereof so as to threadedly receive an externally threaded portion 47 of a shaft 48 that is fastened to the valve member 28 and extends through a central opening 49 of a separator member 50 disposed between the housing sections 30 and 31 as illustrated. The opening 49 in the separator 50 defines opposed axially extending slots 51 which respectively receive outwardly directed fin-like splines 52 on the shaft 48 in the manner illustrated in FIGS. 2 and 8 so as to maintain axial movement of the shaft 48 relative to the housing means 24 as the rotor 41 of the stepper motor 29 is rotated.

A spiral torsion spring 53 has an inner end 54 fastened to the rotor 41 at the side 45 thereof and an outer end 54' interconnected to a cup-shaped casing member 55 that is fastened in any suitable manner to the casing 39 of the stepper motor 29 and thus becomes fixed to the housing means 24.

In this manner, it can be seen that the spiral torsion spring is coiled between its ends 54 and 54' about an axis that is in aligned relation with the shaft 48 of the valve member 28.

The stored energy of the spiral torsion spring increases in proportion to the distance between the valve member 28 and the valve seat 27 when the stepper motor 29 opens the valve. In this manner, should the stepper motor 29 fail or electrical current to the stepper motor 29 terminate for any reason while the valve member 28 is in an open position relative to the valve seat 27, the stored energy of the spiral spring 53 causes the rotor 41 to rotate relative to the housing means 24 in a direction that causes the shaft 48 to axially move upwardly in FIG. 3 and close the valve member 28 against the valve seat 27. The spiral torsion spring 53 has sufficient stored energy therein to maintain the valve member 28 against the valve seat 27.

Thus, it can be seen that the spring 53 has the least stored energy when the valve member 28 is in the closed position against the valve seat 27. This permits the spring 53 to exert the least torque opposing the stepper motor 29 in beginning to open the valve; the stepper motor 29 is required to exert greater torque in beginning to open the valve to overcome force produced by the pressure differential across the valve inlet 22 and valve outlet 23 acting on the area of the valve member 28.

However, because the valve member 28 and the valve seat 27 are in a reverse acting arrangement thereof, the pressure differential acting on the valve member 28 and tending to close the valve member 28 against the valve seat 27 assists the tension spring 53 in driving the valve member 28 to its closed condition against the valve seat 27 should the stepper motor 29 fail or electrical current to the stepper motor 29 terminate for any reason while the valve member 28 is in the open condition thereof.

If desired, suitable spider spring-like plates 56 and 57 can be utilized to close the open end of the spring casing 55 and to load the parts inside the housing section 31 to hold the same in the assembled relation as illustrated.

Therefore, it can be seen that the exhaust gas recirculation valve construction 20 of this invention can be made in a relatively simple manner by the method of this invention to operate in a manner now to be described.

As previously stated, the exhaust gas recirculation valve construction 20 of this invention is adapted to have its inlet 25 interconnected to the exhaust gas supply 22 of an internal combustion engine of an automobile or the like and have its outlet 26 interconnected to the intake manifold 23 of such engine so that suitable electrical signal sending means (not shown) can cause the opening of the valve member 28 relative to the valve seat 27 a certain amount to permit a certain portion of the exhaust gas of the engine to be recirculated back to the intake manifold of the engine for a reason well known in the art.

The stepper motor 29 of the exhaust gas recirculation valve construction of this invention steps the rotor 41 through various degrees of rotation thereof for each current reversal received by the outer coil means 38 so as to position the valve member 28 relative to the valve seat 27 to control the amount of exhaust gas recirculation through the valve construction 20. For example, in one embodiment of the exhaust gas recirculation valve construction 20 of this invention, approximately 48 steps of the rotor 41 are necessary to complete one 360° rotational movement of the rotor 41.

Nevertheless, it can be seen that the stepper motor 29, through rotation of the rotor 41, causes axial movement of the shaft 48 of the valve member 28 to position the valve member 28 relative to the valve seat 27, the opening movement of the rotor 41 causing the spiral torsion spring 53 to be wound in a direction to store energy therein so that should the stepper motor 29 fail or electrical current be terminated to the stepper motor 29 for any reason while the valve member 28 is in an open position relative to the valve seat 27, the spiral torsion spring 53 will cause the rotor 41 to rotate in a direction to cause the valve member 28 to close against the valve seat 27, the pressure differential acting across the valve member 28 also assisting in such closing movement of the valve member 28 against the valve seat 27 as previously stated.

It is believed that by using the reverse acting valve arrangement 27, 28 and having the spiral torsion spring 53 working therewith, there is no need for an overrun mechanism for the valve construction 20 and there is no objectionable bounce back from the stepper motor 29 when the valve member 28 is on the valve seat 27.

Of course, the stepper motor 29 itself can move the valve member 28 to its closed position against the valve seat 27 upon the proper sequential current reversals being directed to the outer coil means 38 to cause the rotor 41 to rotate in a direction that causes upper axial movement of the shaft 48 in FIG. 3 to close the valve member 28 against the valve seat 27. It does not require a failure of the motor means 29 nor a loss of current to the coil means 38 to provide for such closing movement of the valve member 28 relative to the valve seat 27.

Therefore, it can be seen that this invention not only provides a new exhaust gas recirculation valve construction and method of making the same, but also this invention provides a new vehicle exhaust gas recirculation system and method of making the same.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In an exhaust gas recirculation valve construction comprising a housing means provided with an inlet and an outlet separated by a valve seat, an axially movable valve member carried by said housing means for opening and closing said valve seat, and electrically operated stepper motor means carried by said housing means and being operatively interconnected to said valve member for axially positioning said valve member relative to said valve seat, said motor means having a rotatable rotor threadedly interconnected to said valve member to cause axial movement of said valve member upon rotatable movement of said rotor, said valve member and said valve seat being arranged so as to be reverse acting, the improvement wherein said valve construction has spring means operatively interconnected to said valve member to always move said valve member from an open position thereof to its closed position with said valve seat upon loss of electrical current to said motor means.

2. A valve construction as set forth in claim 1 wherein said spring means comprises a torsion spring.

3. A valve construction as set forth in claim 1 wherein said spring means has the force thereof increased as said valve member moves in an opening direction away from said valve seat.

4. A valve construction as set forth in claim 1 wherein said spring means comprises a torsion spring that has opposed ends one of which is interconnected to said rotor and the other of which is interconnected to said housing means, said spring means being wound up by said rotor as said rotor rotates in a direction that causes axial movement of said valve member in an opening direction away from said valve seat.

5. A valve construction as set forth in claim 4 wherein said rotor has a central opening therein that is internally threaded, said valve member having a shaft extending therefrom and having a portion thereof being externally threaded and threadedly received in said internally threaded opening of said rotor to threadedly interconnect said rotor and said valve member together.

6. A valve construction as set forth in claim 5 wherein said spring means comprises a spiral torsion spring.

7. A valve construction as set forth in claim 6 wherein said spiral torsion spring is coiled between said ends thereof about an axis that is substantially aligned with the longitudinal axis of said shaft.

8. A valve construction comprising a housing means provided with an inlet and an outlet separated by a valve seat, an axially movable valve member carried by said housing means for opening and closing said valve seat, and electrically operated stepper motor means carried by said housing means and being operatively interconnected to said valve member for axially positioning said valve member relative to said valve seat, said motor means having a rotatable rotor threadedly interconnected to said valve member to cause axial movement of said valve member upon rotatable movement of said rotor, the improvement wherein said valve construction has spring means operatively interconnected to said valve member to always move said valve member to a certain position relative to said valve seat when said valve member is in a position other than said certain position thereof and upon loss of electrical current to said motor means.

9. A valve construction as set forth in claim 8 wherein said spring means comprises a torsion spring.

10. A valve construction as set forth in claim 8 wherein said spring means has the force thereof increased as said valve member moves in a certain direction relative to said valve seat.

11. A valve construction as set forth in claim 8 wherein said spring means comprises a torsion spring that has opposed ends one of which is interconnected to said rotor and the other of which is interconnected to said housing means, said spring means being wound up by said rotor as said rotor rotates in a direction that causes axial movement of said valve member in a certain direction relative to said valve seat.

12. A valve construction as set forth in claim 11 wherein said rotor has a central opening therein that is internally threaded, said valve member having a shaft extending therefrom and having a portion thereof being externally threaded and threadedly received in said internally threaded opening of said rotor to threadedly interconnect said rotor and said valve member together.

13. A valve construction as set forth in claim 12 wherein said spring means comprises a spiral torsion spring.

14. A valve construction as set forth in claim 13 wherein said spiral torsion spring is coiled between said ends thereof about an axis that is substantially aligned with the longitudinal axis of said shaft.

* * * * *